United States Patent
Wang et al.

(10) Patent No.: US 12,103,009 B2
(45) Date of Patent: Oct. 1, 2024

(54) ENERGY-SAVING PREPARATION SYSTEM FOR SILICON-CARBON ANODE MATERIAL OF LITHIUM BATTERY

(71) Applicant: Inner Mongolia Hengke New Material Technology Co., Ltd., Ulanqab (CN)

(72) Inventors: Tengshi Wang, Ulanqab (CN); Lin Xiang, Ulanqab (CN)

(73) Assignee: INNER MONGOLIA HENGKE NEW MATERIAL TECHNOLOGY CO., LTD., Ulanqab (CN)

( * ) Notice: Subject to any disclaimer, the term of this patent is extended or adjusted under 35 U.S.C. 154(b) by 296 days.

(21) Appl. No.: 17/489,278

(22) Filed: Sep. 29, 2021

(65) Prior Publication Data
US 2022/0331814 A1 Oct. 20, 2022

(30) Foreign Application Priority Data

Apr. 15, 2021 (CN) .......................... 202110407597.1

(51) Int. Cl.
| | |
|---|---|
| B02C 18/12 | (2006.01) |
| B02C 2/10 | (2006.01) |
| B02C 18/16 | (2006.01) |
| B02C 18/24 | (2006.01) |
| B02C 23/00 | (2006.01) |
| B02C 23/10 | (2006.01) |
| H01M 4/02 | (2006.01) |
| H01M 4/04 | (2006.01) |
| H01M 4/133 | (2010.01) |
| H01M 4/134 | (2010.01) |
| H01M 4/1393 | (2010.01) |

(Continued)

(52) U.S. Cl.
CPC .............. *B02C 18/12* (2013.01); *B02C 18/24* (2013.01); *H01M 4/04* (2013.01); *B02C 2018/162* (2013.01); *H01M 2004/027* (2013.01); *H01M 4/133* (2013.01); *H01M 4/134* (2013.01)

(58) Field of Classification Search
CPC ..... B02C 18/12; B02C 2018/162; B02C 2/10; B02C 23/00; B02C 23/10; H01M 4/04; H01M 4/133; H01M 4/134; H01M 2004/027

See application file for complete search history.

(56) References Cited

FOREIGN PATENT DOCUMENTS

CN 108906215 A * 11/2018 ............. B02C 23/04

OTHER PUBLICATIONS

English translate (CN108906215A), retrieved date Dec. 9, 2023.*

* cited by examiner

*Primary Examiner* — Mohammed S. Alawadi
(74) *Attorney, Agent, or Firm* — Tutunjian & Bitetto, P.C.

(57) ABSTRACT

An energy-saving preparation system for a silicon-carbon anode material of a lithium battery includes a pulverizing box and a feed port. The feed port is formed in the top of the pulverizing box; a pulverizing roller is rotatably mounted inside the pulverizing box; the inner wall of the pulverizing box is symmetrically fixedly connected with mounting plates; fixed plates are symmetrically fixedly connected between the two mounting plates; the surfaces of the two mounting plates are fixedly connected with rotating devices; the two fixed plates are fixedly connected with the rotating devices; the rotating devices are slidably connected with the pulverizing roller; the upper parts of the two mounting plates are fixedly connected with transverse plates; the rotating devices and the transverse plates are rotatably installed.

8 Claims, 5 Drawing Sheets

(51) Int. Cl.
*H01M 4/36* (2006.01)
*H01M 4/38* (2006.01)
*H01M 4/583* (2010.01)
*H01M 4/62* (2006.01)
*H01M 10/052* (2010.01)

ENERGY-SAVING PREPARATION SYSTEM FOR SILICON-CARBON ANODE MATERIAL OF LITHIUM BATTERY

This patent application claims the benefit and priority of Chinese Patent Application No. 202110407597.1, filed on Apr. 15, 2021, the disclosure of which is incorporated by reference herein in its entirety as part of the present application.

FIELD

The present disclosure relates to the technical field of lithium batteries, and specifically relates to an energy-saving preparation system for a silicon-carbon anode material of a lithium battery.

BACKGROUND

Because of its extremely high theoretical capacity (4200 mAh/g), silicon (Si) is considered to replace or supplement a graphite anode of next-generation lithium-ion batteries (LIBs). It has received extensive attention from the scientific and industrial circles, and is committed to commercializing silicon-based anode materials. However, silicon, as a storage material for Li, will inevitably face two major challenges: first, serious volume expansion will occur during repeated lithiation/delithiation; and second, compared with graphite, the silicon has poor electronic conductivity. The former leads to obstruction of electron transport in an electrode and continuous fracture of a solid electrolyte interphase (SEI), and the latter strictly limits a load of a silicon-based material in the electrode.

Steps of preparing a silicon-carbon anode material of a lithium battery are: thermally treating silicon to obtain silicon and silicon oxides, then crushing them to obtain smaller granular silicon and silicon oxides, grinding and sieving the silicon and silicon oxides, dispersing them in water, adding a surfactant, stirring at room temperature to complete resin coating for the silicon and the silicon oxides, putting them into a heating furnace filled with argon or nitrogen for carbonization to obtain a carbon-coated compound of the silicon and silicon oxides, removing impurities, and performing filtering, cleaning and drying to obtain the silicon-carbon anode material.

In the grinding process, the bulk silicon and silicon oxides need to be preliminarily pulverized. A pulverizing device used in an existing laboratory has low adaptability and cannot adapt to the pulverization of the silicon and silicon oxides of different bulk sizes within a certain range. An energy-saving preparation system for the silicon-carbon anode material of the lithium battery is provided.

SUMMARY

The present disclosure aims to provide an energy-saving preparation system for a silicon-carbon anode material of a lithium battery to solve the problems mentioned in the background art.

In order to achieve the above-mentioned objective, the present disclosure provides the following technical solution: An energy-saving preparation system for a silicon-carbon anode material of a lithium battery includes a pulverizing box and a feed port. The feed port is formed in the top of the pulverizing box; a pulverizing roller is rotatably mounted inside the pulverizing box; the inner wall of the pulverizing box is symmetrically fixedly connected with mounting plates; fixed plates are symmetrically fixedly connected between the two mounting plates; the surfaces of the two mounting plates are fixedly connected with rotating devices; the two fixed plates are fixedly connected with the rotating devices; the rotating devices are slidably connected with the pulverizing roller; the upper parts of the two mounting plates are fixedly connected with transverse plates; the rotating devices and the transverse plates are rotatably installed; the insides of the transverse plates are rotatably connected with transmission devices; the two mounting plates are fixedly connected with the transmission devices; the inner wall of the pulverizing box is symmetrically fixedly connected with vertical plates; the insides of the vertical plates are rotatably connected with adjustment devices; the adjustment devices and the transmission devices are installed in a cooperation manner; the adjustment devices are rotatably connected with the pulverizing roller; and the inner wall of the pulverizing box located below the two vertical plates is fixedly connected with a filter net.

Preferably, each rotating device includes a motor box, a servo motor, a transmission shaft, a first bevel gear, a transmission column, a first column slot, a first groove and a convex block; the motor boxes are fixedly connected between the two mounting plates and the fixed plates; the servo motors are mounted inside the motor boxes; the output ends of the servo motors are fixedly connected with the transmission shafts; ends of the transmission shafts away from the servo motors are fixedly connected with the first bevel gears; the upper parts of the first bevel gears are fixedly connected with the transmission columns; the bottom of the pulverizing roller is provided with the first column slots; ends of the surfaces of the first column slots away from the bottom of the pulverizing roller are provided with the grooves; the transmission columns are slidably connected with the first column slots; ends of the surfaces of the transmission columns away from the first bevel gears are fixedly connected with the convex blocks; and the convex blocks are slidably connected with the first grooves.

Preferably, each transmission device includes a second bevel gear, a first square column, a second column slot, a third column slot, a spring, a fixed ring, a third square column, an electric telescopic rod, a movable plate, a fourth column slot and a second square column. The outer sides of the first bevel gears are symmetrically connected with four second bevel gears in an engaged manner; the four second bevel gears and the transverse plates are rotatably installed; the surfaces of the second bevel gears are fixedly connected with the first square columns; the second column slots are symmetrically formed inside the transverse plates; the surfaces of the second column slots are slidably connected with the fixed rings; the insides of the transverse plates are symmetrically rotatably provided with the third square columns; the third square columns are fixedly connected with the fixed rings; the surfaces of the third square columns are sleeved with springs; ends of the springs close to the second bevel gears are fixedly connected with the fixed rings; the third column slots are formed in ends of the third square columns close to the second bevel gears; the third column slots and the first square columns are installed in a cooperation manner; the surfaces of the third square columns are rotatably connected with the movable plates; the surfaces of the movable plates are fixedly connected with the electric telescopic rods; ends of the four electric telescopic rods away from the movable plates are respectively fixedly connected with the mounting plates and the fixed plates; the surfaces of the vertical plates are rotatably provided with the second square columns; the fourth column slots are formed inside the second square columns; and the fourth column slots and the third square columns are installed in a cooperation manner.

Preferably, each adjustment device includes a worm, a worm wheel, a screw rod, a ringlike slot, a connection column and a sleeve ring; the insides of the vertical plates are rotatably connected with the worms; one end of each worm is fixedly connected with each second square column; the outer sides of the worms are engaged with the worm wheels; the upper parts of the worm wheels are fixedly connected with the screw rods; ends of the surfaces of the screw rods away from the worm wheels are in threaded connection with the connection columns; the bottom of the pulverizing roller is provided with the ringlike slots; the bottoms of the ringlike slots are rotatably connected with the sleeve rings; and the four connection columns are fixedly connected with the sleeve rings.

Preferably, the bottom of the pulverizing roller is fixedly connected with a ringlike plate.

Preferably, one end of the inner wall of the pulverizing box away from the filter net is fixedly connected with a top plate; the inside of the top plate is fixedly connected with a vertical column; and the vertical column and the pulverizing roller are rotatably installed.

Preferably, a material outlet is formed in a surface of the pulverizing box, and a material discharging valve is mounted inside the material outlet.

Preferably, an initial state of the spring is a compressed state.

Preferably, the inner wall of the pulverizing box located below the two vertical plates is fixedly connected with the filter net.

Compared with the prior art, the present disclosure has the following beneficial effects.

The present disclosure uses one servo motor to simultaneously achieve adjusting and pulverizing effects. The servo motor drives the transmission shafts to rotate to drive the first bevel gears and the transmission columns to rotate; the pulverizing roller can be driven to rotate by means of cooperation between the grooves and the convex blocks, so that the bulk silicon and silicon oxides are pulverized; at this time, the electric telescopic rods are in a retracted state; the electric telescopic rods extend to drive the third square columns to cooperate with the fourth column slots to drive the worms to rotate, thus driving the worm wheels and the screw rods to rotate to adjust an up-down position of the pulverizing roller, so as to adapt to pulverization of silicon and silicon oxides of different bulk sizes within a certain range.

Reference signs in drawings: 1: pulverizing box; 2: feed port; 3: pulverizing roller; 4: mounting plate; 5: fixed plate; 6: rotating device; 7: transverse plate; 8: transmission device; 9: vertical plate; 10: adjustment device; 11: filter net; 12: motor box; 13: servo motor; 14: transmission shaft; 15: first bevel gear; 16: transmission column; 17: first column slot; 18: first groove; 19: convex block; 20: second bevel gear; 21: first square column; 22: second column slot; 23: third column slot; 24: spring; 25: fixed ring; 26: third square column; 27: electric telescopic rod; 28: movable plate; 29: fourth column slot; 30: second square column; 31: worm; 32: worm wheel; 33: screw rod; 34: ringlike slot; 35: connection column; 36: sleeve ring; 37: ringlike plate; 38: top plate; 39: vertical column; 40: material outlet; 41: material discharging valve.

DETAILED DESCRIPTION

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

Figure 1:
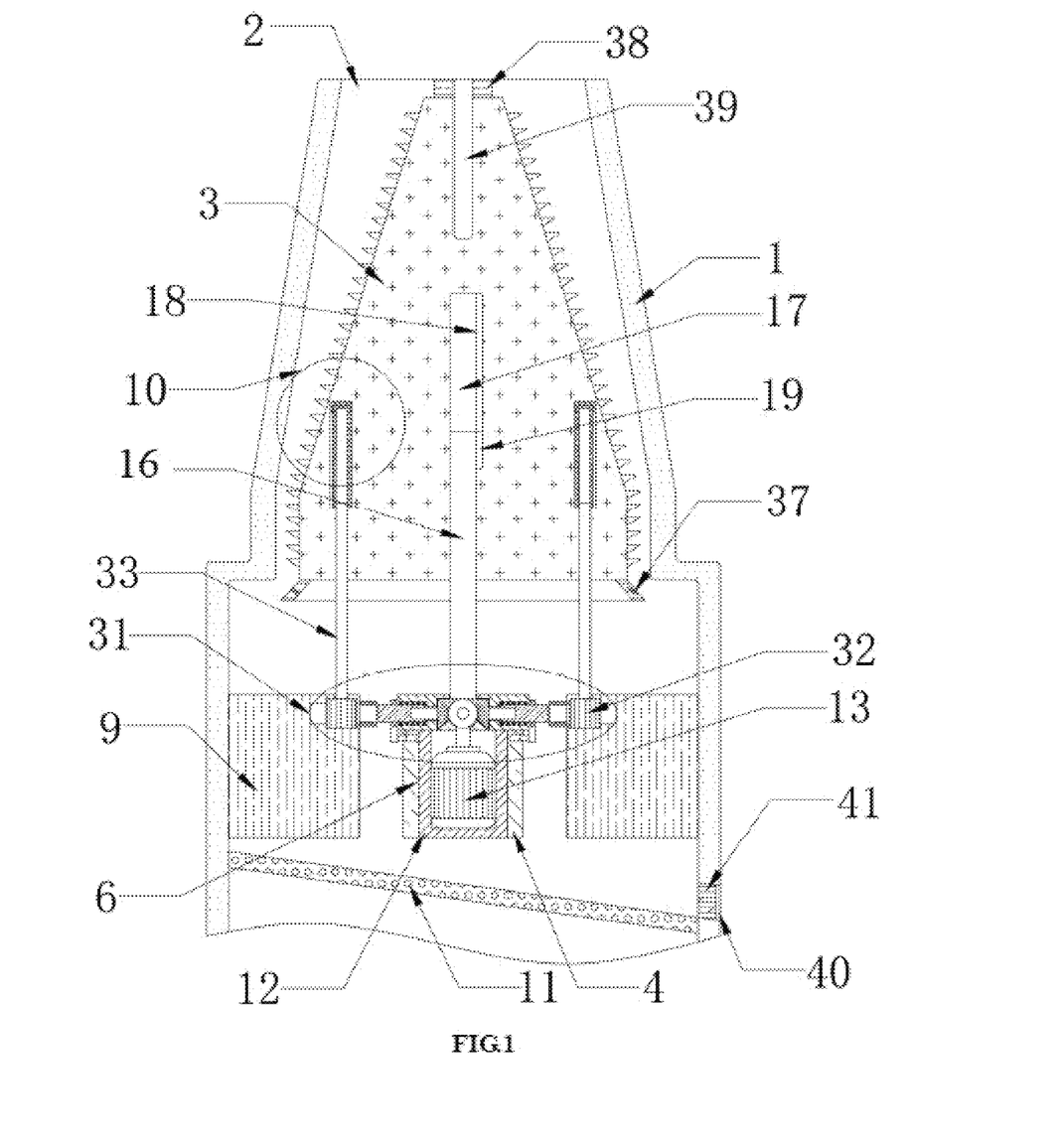
FIG. 1 is a schematic diagram of an overall sectional structure of the present disclosure.
Figure 3:
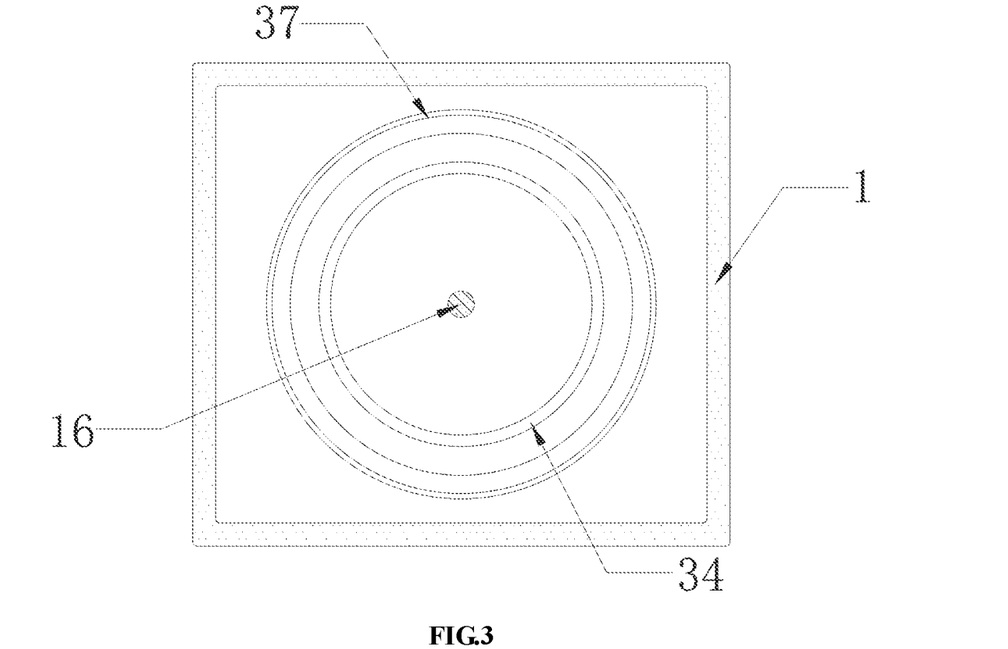
FIG. 3 is a schematic structural diagram of a top view of a pulverizing roller of the present disclosure.
Figure 5:
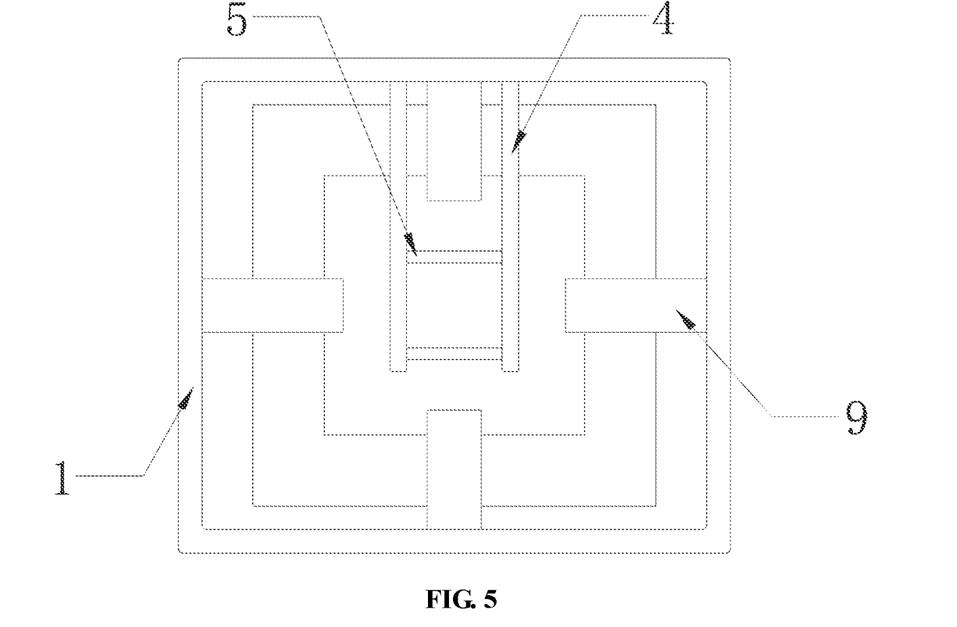
FIG. 5 is a schematic structural diagram of a top view of a pulverizing box of the present disclosure.

Referring to FIGS. 1, 3, and 5, the present disclosure provides the following exemplary technical solution: An energy-saving preparation system for a silicon-carbon anode material of a lithium battery includes a pulverizing box 1 and a feed port 2. The feed port 2 is formed in the top of the pulverizing box 1; a pulverizing roller 3 is rotatably mounted inside the pulverizing box 1; the inner wall of the pulverizing box 1 is symmetrically fixedly connected with mounting plates 4; fixed plates 5 are symmetrically fixedly connected between the two mounting plates 4; the surfaces of the two mounting plates 4 are fixedly connected with rotating devices 6; the two fixed plates 5 are fixedly connected with the rotating devices 6; the rotating devices 6 are slidably connected with the pulverizing roller 3; the upper parts of the two mounting plates 4 are fixedly connected with transverse plates 7; the rotating devices 6 and the transverse plates 7 are rotatably installed; the insides of the transverse plates 7 are rotatably connected with transmission devices 8; the two mounting plates 4 are fixedly connected with the transmission devices 8; the inner wall of the pulverizing box 1 is symmetrically fixedly connected with vertical plates 9; the insides of the vertical plates 9 are rotatably connected with adjustment devices 10; the adjustment devices 10 and the transmission devices 8 are installed in a cooperation manner; and the adjustment devices 10 are rotatably connected with the pulverizing roller 3.

Referring to FIG. 1, each rotating device 6 includes a motor box 12, a servo motor 13, a transmission shaft 14, a first bevel gear 15, a transmission column 16, a first column slot 17, a first groove 18 and a convex block 19; the motor boxes 12 are fixedly connected between the two mounting plates 4 and the fixed plates 5; the servo motors 13 are mounted inside the motor boxes 12; the output ends of the servo motors 13 are fixedly connected with the transmission shafts 14; ends of the transmission shafts 14 away from the servo motors 13 are fixedly connected with the first bevel gears 15; the upper parts of the first bevel gears 15 are fixedly connected with the transmission columns 16; the bottom of the pulverizing roller 3 is provided with the first column slots 17; ends of the surfaces of the first column slots 17 away from the bottom of the pulverizing roller 3 are provided with the grooves; the transmission columns 16 are slidably connected with the first column slots 17; ends of the surfaces of the transmission columns 16 away from the first bevel gears 15 are fixedly connected with the convex blocks 19; and the convex blocks 19 are slidably connected with the first grooves 18 to play a role of outputting power. Meanwhile, the pulverizing roller 3 can be driven to rotate. The servo motor 13 is initiated to drive the transmission shafts 14 to rotate, and the first bevel gears 15 and the transmission columns 16 rotate along with the rotation of the transmission shafts 14. Due to the cooperation between the grooves and the convex blocks 19, the pulverizing roller 3 can be driven to rotate to pulverize bulk silicon and silicon oxides.

Figure 2:
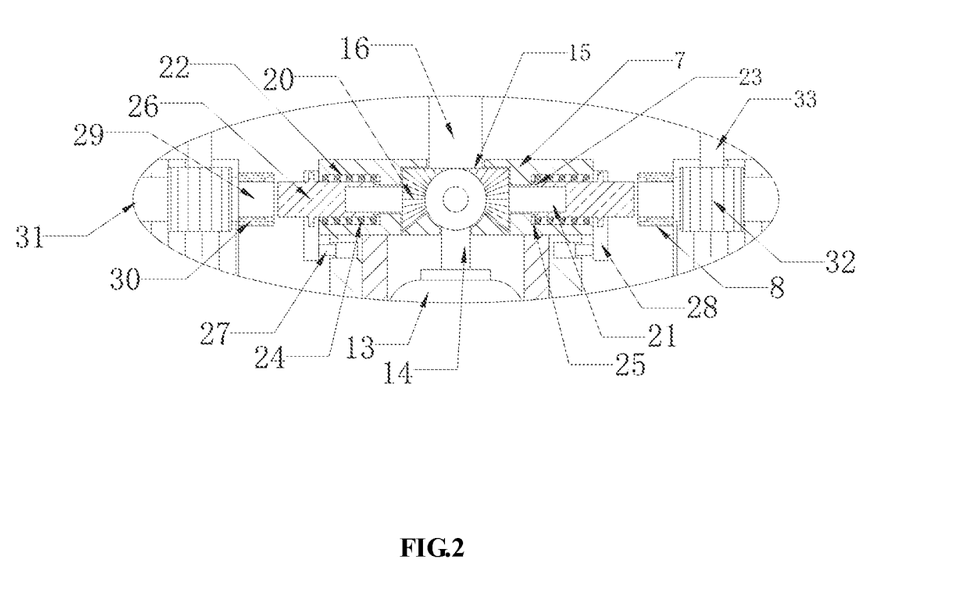
FIG. 2 is a schematic structural diagram of a transmission device of the present disclosure.

Referring to FIGS. 1 and 2, each transmission device 8 in this example includes a second bevel gear 20, a first square column 21, a second column slot 22, a third column slot 23, a spring 24, a fixed ring 25, a third square column 26, an electric telescopic rod 27, a movable plate 28, a fourth column slot 29 and a second square column 30. The outer sides of the first bevel gears 15 are symmetrically connected with four second bevel gears 20 in an engaged manner; the four second bevel gears 20 and the transverse plates 7 are rotatably installed; the surfaces of the second bevel gears 20 are fixedly connected with the first square columns 21; the second column slots 22 are symmetrically formed inside the transverse plates 7; the surfaces of the second column slots 22 are slidably connected with the fixed rings 25; the insides of the transverse plates 7 are symmetrically rotatably provided with the third square columns 26; the third square columns 26 are fixedly connected with the fixed rings 25; the surfaces of the third square columns 26 are sleeved with springs 24; ends of the springs 24 close to the second bevel gears 20 are fixedly connected with the fixed rings 25; the third column slots 23 are formed in ends of the third square columns 26 close to the second bevel gears 20; the third column slots 23 and the first square columns 21 are installed in a cooperation manner; the surfaces of the third square columns 26 are rotatably connected with the movable plates 28; the surfaces of the movable plates 28 are fixedly connected with the electric telescopic rods 27; ends of the four electric telescopic rods 27 away from the movable plates 28 are respectively fixedly connected with the mounting plates 4 and the fixed plates 5; the surfaces of the vertical plates 9 are rotatably provided with the second square columns 30; the fourth column slots 29 are formed inside the second square columns 30; and the fourth column slots 29 and the third square columns 26 are installed in a cooperation manner to play a transmission role. The servo motor 13 is initiated, and the electric telescopic rods 27 extend to drive the movable plates 28 and the third square columns 26 to move towards a direction away from the second bevel gears 20, thus driving the third square columns 26 and the fourth column slots 29 to cooperate. In this process, the springs 24 are further compressed, and a generated counteracting force acts on the surfaces of the fixed rings 25; when the third square columns 26 move to be farthest from the second bevel gears 20, the springs 24 reach the maximum elasticity limit, and the first square columns 21 are not separated from the second column slots 22; the first bevel gears 15 rotate to drive the four second bevel gears 20 to rotate, thus driving the first square columns 21 to rotate and driving the third square columns 26 to rotate; and the second square columns 30 are driven to rotate.

Figure 4:
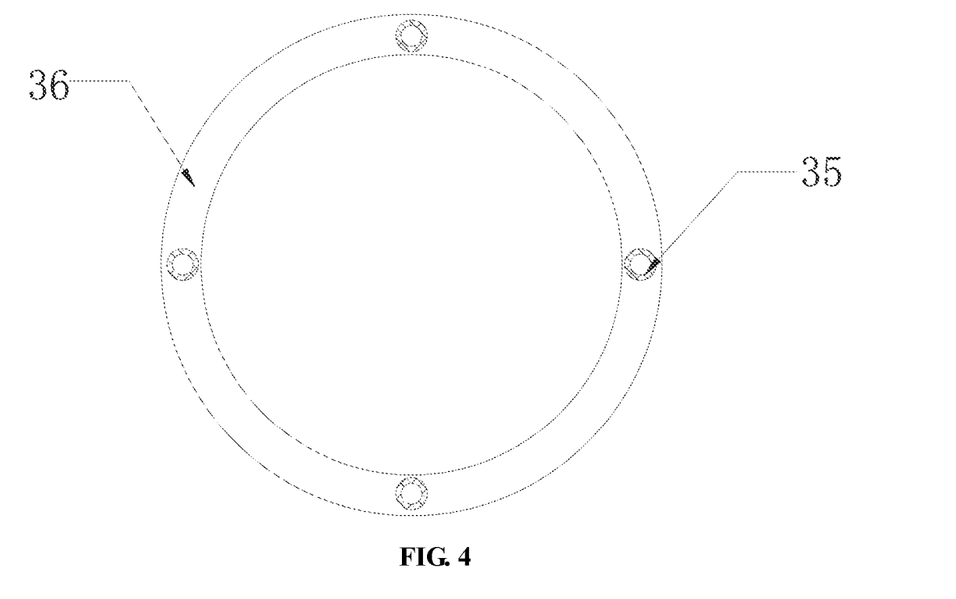
FIG. 4 is a schematic structural diagram of a sleeve ring of the present disclosure.
Figure 6:
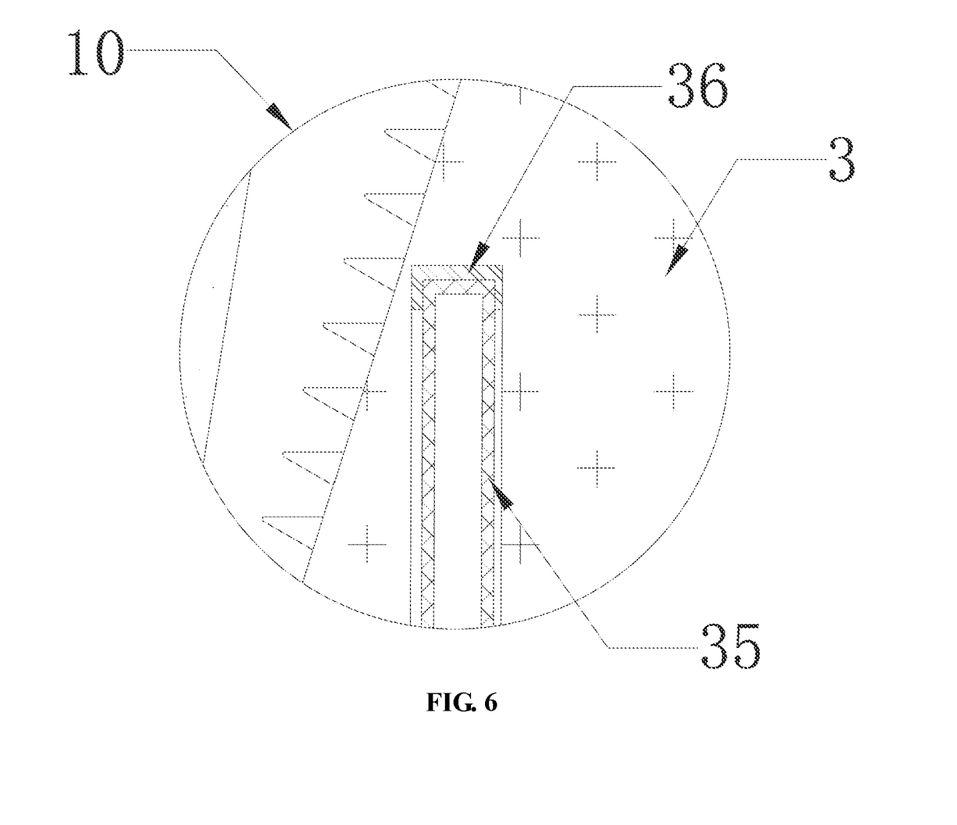
FIG. 6 is a schematic structural diagram of an adjustment device of the present disclosure.

Referring to FIGS. 1, 4, and 6, each adjustment device 10 in this example includes a worm 31, a worm wheel 32, a screw rod 33, a ringlike slot 34, a connection column 35 and a sleeve ring 36; the insides of the vertical plates 9 are rotatably connected with the worms 31; one end of each worm 31 is fixedly connected with each second square column 30; the outer sides of the worms 31 are engaged with the worm wheels 32; the upper parts of the worm wheels 32 are fixedly connected with the screw rods 33; ends of the surfaces of the screw rods 33 away from the worm wheels 32 are in threaded connection with the connection columns 35; the bottom of the pulverizing roller 3 is provided with the ringlike slots 34; the bottoms of the ringlike slots 34 are rotatably connected with the sleeve rings 36; and the four connection columns 35 are fixedly connected with the sleeve rings 36. The second square columns 30 rotate to drive the worms 31 to rotate, thus driving the worm wheels 32 and the screw rods 33 to rotate; the screw rods 33 are in threaded connection with the connection columns 35 to drive the pulverizing roller 3 to move down a certain distance to adapt to pulverization of the bulk silicon and silicon oxides of different sizes. Adaptability is achieved.

Referring to FIG. 1, the bottom of the pulverizing roller 3 is fixedly connected with a ringlike plate 37 to play a role of guiding materials.

Referring to FIG. 1, one end of the inner wall of the pulverizing box 1 away from the filter net 11 is fixedly connected with a top plate 38; the inside of the top plate 38 is fixedly connected with a vertical column 39; and the vertical column 39 and the pulverizing roller 3 are rotatably installed to further ensure the stability of the pulverizing roller 3.

Referring to FIG. 1, a material outlet 40 is formed in a surface of the pulverizing box 1, and a material discharging valve 41 is mounted inside the material outlet 40 and used to discharge the materials.

An initial state of the springs 24 is a compressed state; the counteracting force generated by compression of the springs 24 acts on the surfaces of the fixed rings 25, so that the third square columns 26 are clung to the bottoms of the second column slots.

Referring to FIG. 1, the inner wall of the pulverizing box 1 located below the two vertical plates 9 is fixedly connected with a filter net 11 to screen the pulverized material.

Working principle: A controller may be mounted on a surface of the pulverizing box 1; the servo motor 13, the material discharging valve 41 and the electric telescopic rods 27 are all connected with the controller through leads; the controller is precisely controlled by a computer or other control terminals; the bulk silicon and silicon oxides are put into the pulverizing box 1; the initial state of the electric telescopic rods 27 is the retracted state; the electric third square columns 26 and the fourth column slots 29 are separated, which are controlled by the controller. The servo motor 13 is initiated to drive the transmission shafts 14 to rotate; the first bevel gears 15 and the transmission columns 16 rotate along with the rotation of the transmission shafts 14. Due to the cooperation between the grooves and the convex blocks 19, the pulverizing roller 3 can be driven to rotate to pulverize the bulk silicon and silicon oxides. According to an actual situation, before pulverization, if the bulk silicon and silicon oxides have a relatively large volume within a certain range, the controller controls the servo motor 13 to be initiated and the electric telescopic rods 27 to extend, thus driving the movable plates 28 and the third square columns 26 to move towards the direction away from the second bevel gears 20 and then driving the third square columns 26 and the fourth column slots 29 to cooperate. In this process, the springs 24 are further compressed, and generated counteracting force acts on the surfaces of the fixed rings 25; when the third square columns 26 move to be farthest from the second bevel gears 20, the springs 24 reach the maximum elasticity limit, and the first square columns 21 are not separated from the second column slots 22; the first bevel gears 15 rotate to drive the four second bevel gears 20 to rotate, thus driving the first square columns 21, the third square columns 26, the second square columns 30, the worms 31, the worm wheels 32 and the screw rods 33 to rotate. The screw rods 33 and the connection columns 35 are in threaded connection to drive the pulverizing roller 3 to move down a certain distance to adapt to the pulverization of the bulk silicon and silicon oxides of different sizes. Adaptability is achieved. After the pulverization, the filter net filters the bulk silicon and silicon oxides; and the material discharging valve 41 is opened to discharge relatively large particles from the material outlet 40.

It should be noted that in this context, relational terms such as first and second are used merely to distinguish one entity or operation from another entity or operation, instead of necessarily requiring or implying that these entities or operations have any of these actual relationships or orders. Furthermore, terms "include", "including" or any other variants are meant to cover non-exclusive inclusions, so that a process, method, object or device that includes a series of elements not only includes those elements, but also includes other elements which are not definitely listed, or further includes inherent elements of this process, method, object or device.

Although the embodiments of the present disclosure have been shown and described, it will be understood by those of ordinary skill in the art that various changes, modifications, substitutions, and variations can be made to these embodiments without departing from the principle and spirit of the present disclosure. The scope of the present disclosure is defined by the attached claims and their equivalents.

What is claimed is:

1. An energy-saving preparation system for a silicon-carbon anode material of a lithium battery, the system comprising:
    a pulverizing box (1) having a feed port (2) formed in a top of the pulverizing box, the pulverizing box having opposing inner walls;
    at least a pair of opposing mounting plates (4) attached to opposing inner walls of the pulverizing box (1);
    a pair of vertical plates (9) attached to the opposing inner walls of the pulverizing box (1),
    at least one transmission device (8) connected to at least one vertical plate of the pair of vertical plates (9);
    at least one fixed plate (5) fixedly connected between the pair of opposing mounting plates (4);
    a pulverizing roller (3) rotatably mounted inside the pulverizing box (1);
    a rotating device (6) positioned between and connected to the pair of opposing mounting plates (4), the rotating device (6) being connected with the pulverizing roller (3) and configured to selectively rotate the pulverizing roller (3); and
    at least one adjustment device (10) rotatably integrated into each one of the pair of vertical plates (9) and connected with the pulverizing roller (3) to enable a vertical adjustment of the pulverizing roller during rotation by the rotating device (6), the at least one transmission device (8) and the at least one adjustment device (10) operating in a cooperating manner;
    the at least one adjustment device (10) further comprising:
    at least one worm gear (31) having opposing ends;
    at least one worm wheel (32) positioned within each one of the pair of vertical plates (9) and being in communication with one end of the at least one worm gear (31);
    at least one screw rod (33) connected to and extending vertically from the worm wheel (32) into the pulverizing roller (3);
    a ringlike slot (34) positioned on a bottom of the pulverizing roller (3); and
    a sleeve ring (36) positioned on a bottom of the ringlike slot (34) and having at least one connection column (35) in threaded connection with the screw rod (33).

2. The energy-saving preparation system for the silicon-carbon anode material of the lithium battery according to claim 1, wherein the rotating device (6) comprises:
    a motor box (12) connected between the pair of mounting plates (4),
    a servo motor (13) positioned within the motor box,
    a transmission shaft (14) connected to and extending upward from the servo motor (13),
    a first bevel gear (15) in communication with the transmission shaft (14),
    a transmission column (16) having one end in communication with an upper part of the first bevel gear (15),
    a first column slot (17) centrally disposed in the pulverizing roller (3) and extending from a bottom of the pulverizing roller (3) to a predetermined point internal to the pulverizing roller (3),
    a first groove (18) positioned at an end surface of the first column slot (17) internal to the pulverizing roller, wherein the transmission column (16) is slidably connected with the first column slot (17); and
    a convex block 19 connected to another end of the transmission column (16) away from the first bevel gear (15) and being slidably connected with the first groove (18).

3. The energy-saving preparation system for the silicon-carbon anode material of the lithium battery according to claim 2, wherein each of the at least one transmission device (8) comprises:
    four second bevel gears (20) having outer surfaces symmetrically engaged and in communication with the first bevel gear (15), the four second bevel gears and the transverse plates (7) be rotatably installed;
    a first square column (21),
    a second column slot (22) symmetrically formed in the transverse plates (7),
    a spring (24),
    a fixed ring (25), wherein surfaces of the second column slots (22) are in slidable communication with the fixed ring (25);
    a third square column (26) connected with the fixed ring (25) and sleeved with a spring (24), wherein an end of the spring (24) close to the second bevel gears is connected with the fixed ring, the transverse plates (7) being symmetrically positioned with the third square column (26),
    a third column slot (23) formed in ends of the third square column (26) close to the second bevel gears (20); the third column slot (23) and the first square columns (21) are cooperatively installed;
    at least one electric telescopic rod (27) having two ends,
    at least one movable plate (28) having surfaces connected with a first end of the at least one electric telescopic rod (27), wherein surfaces of the third square column (26) are rotatably connected with the at least one movable plate (28) and a second end of the at least one electric telescopic rod (27) is connected with the mounting plates (4) and fixed plates (5);

a fourth column slot (29) formed inside the second square columns (30), wherein the fourth column slot (29) and the third square columns (26) are installed cooperatively.

4. The energy-saving preparation system for the silicon-carbon anode material of the lithium battery according to claim 3, wherein an initial state of the spring (24) is a compressed state.

5. The energy-saving preparation system for the silicon-carbon anode material of the lithium battery according to claim 1, wherein a bottom of the pulverizing roller is fixedly connected with a ringlike plate (37).

6. The energy-saving preparation system for the silicon-carbon anode material of the lithium battery according to claim 1, further comprising a top plate connected to an inner wall of the pulverizing box (1) away from a filter net;

wherein an inside of the top plate being connected with a vertical column, and the vertical column and the pulverizing roller are rotatably installed.

7. The energy-saving preparation system for the silicon-carbon anode material of the lithium battery according to claim 1, further comprising a material outlet (40) formed in a surface of the pulverizing box (1), and a material discharging valve (41) mounted inside the material outlet.

8. The energy-saving preparation system for the silicon-carbon anode material of the lithium battery according to claim 1, further comprising a filter net (11) connected to an inner wall of the pulverizing box (1) below the pair of vertical plates (9).

* * * * *